US010277960B2

(12) United States Patent
Markel et al.

(10) Patent No.: US 10,277,960 B2
(45) Date of Patent: Apr. 30, 2019

(54) METHOD AND SYSTEM FOR SEEDING VIDEO PROGRAMS WITH EPISODIC INTERACTIVE ITEMS

(71) Applicant: Tap Media Labs, Inc., Burnaby (CA)

(72) Inventors: Steven Owen Markel, Highlands Ranch, CO (US); Theo Chitayat, Los Angeles, CA (US); John Mark Robinson, Vancouver (CA)

(73) Assignee: Tap Media Labs, Inc., Burnaby (CA)

( * ) Notice: Subject to any disclaimer, the term of this patent is extended or adjusted under 35 U.S.C. 154(b) by 0 days.

(21) Appl. No.: 15/875,942

(22) Filed: Jan. 19, 2018

(65) Prior Publication Data

US 2018/0220203 A1 Aug. 2, 2018

Related U.S. Application Data

(60) Provisional application No. 62/452,336, filed on Jan. 30, 2017.

(51) Int. Cl.
*H04N 9/80* (2006.01)
*H04N 5/93* (2006.01)
(Continued)

(52) U.S. Cl.
CPC ....... *H04N 21/854* (2013.01); *G06K 9/00718* (2013.01); *H04N 21/2353* (2013.01); *H04N 21/23418* (2013.01); *H04N 21/44008* (2013.01); *H04N 21/4725* (2013.01); *H04N 21/816* (2013.01); *H04N 21/8133* (2013.01); *H04N 21/84* (2013.01); *H04N 21/8583* (2013.01)

(58) Field of Classification Search
USPC ........ 386/239, 241, 278, 280, 282; 348/169, 348/207.99, 208.14
See application file for complete search history.

(56) References Cited

U.S. PATENT DOCUMENTS 9,478,033 B1\* 10/2016 Safreed ................. H04N 19/54
2013/0163958 A1 6/2013 Totoki
(Continued)

OTHER PUBLICATIONS

Brandon Castellano, PySceneDetect v0.4 Introduction, Jan. 14, 2017, 1 pages << https://pyscenedetect.readthedocs.io/en/v0.4/ >>.
Brandon Castellano, PySceneDetect v0.4 Features & Roadmap, Jan. 14, 2017, 2 pages << https://pyscenedetect.readthedocs.io/en/v0.4/features/ >>.

(Continued)

*Primary Examiner* — Daquan Zhao
(74) *Attorney, Agent, or Firm* — Scot A. Reader

(57) ABSTRACT

A computer-implemented method and system for seeding video programs with episodic interactive items improve computer performance by averting tracking loss. The system includes a scene map table that maintains a scene record for every scene in the video. The scene record contains boundary information for the scene and linking information to companion scenes that are visually similar. When a developer tags an episodic item in the video for interactivity, the scene record for the scene where the item is tagged is accessed in the scene map table. The boundary information from this scene record is used to track the item across the scene without tracking loss and the linking information from this scene record is used to access scene records for companion scenes, allowing the item to be tracked across the companion scenes without tracking loss.

25 Claims, 8 Drawing Sheets

(51) Int. Cl.
  *G11B 27/00*    (2006.01)
  *H04N 21/854*   (2011.01)
  *H04N 21/81*    (2011.01)
  *H04N 21/84*    (2011.01)
  *H04N 21/4725*  (2011.01)
  *G06K 9/00*     (2006.01)
  *H04N 21/235*   (2011.01)
  *H04N 21/858*   (2011.01)
  *H04N 21/234*   (2011.01)
  *H04N 21/44*    (2011.01)
  *H04N 5/225*    (2006.01)
  *H04N 5/228*    (2006.01)

(56) References Cited

U.S. PATENT DOCUMENTS

2014/0093176 A1* 4/2014 Maeda ............... G06K 9/00744
                                                382/195
2014/0253732 A1* 9/2014 Brown ...................... G06T 7/80
                                                348/159

OTHER PUBLICATIONS

Brandon Castellano, PsySceneDetect v0.4 Basic Usage, Jan. 14, 2017, 4 pages << https://pyscenedetect.readthedocs.io/en/v0.4/examples/usage/ >>.

Brandon Castellano, PsySceneDetect v0.4 Examples, Jan. 14, 2017, 5 pages << https://pyscenedetect.readthedocs.io/en/v0.4/examples/usage-example/ >>.

Brandon Castellano, PsySceneDetect v0.4 Scene Detection Method Details, Jan. 14, 2017, 1 page << https://pyscenedetect.readthedocs.io/en/v0.4/reference/detection-methods/ >>.

Brandon Castellano, PsySceneDetect v0.4 Integration w/ Other Applications, Jan. 14, 2017, 1 page << https://pyscenedetect.readthedocs.io/en/v0.4/reference/python-usage/ >>.

Brandon Castellano, PsySceneDetect v0.4 Creating New Methods, Jan. 14, 2017, 1 page << https://pyscenedetect.readthedocs.io/en/v0.4/reference/creating-new-scene-detectors/ >>.

Scikit-Video Developers, Detecting Scene Boundaries—scikit-video 1.1.10 docs, 2015-17, 2 pages << http://www.scikit-video.org/stable/examples/scene.html#sceneexamples >>.

Specification, Drawings and Abstract of Markel et al. U.S. Appl. No. 13/771,323, filed Feb. 20, 2013, 37 pages.

* cited by examiner

500 Fig. 5

| | |
|---|---|
| INTRODUCTION | SCENE START: 0<br>SCENE END: 100 |
| JIM TALKING<br>TAGGED ITEM A | SCENE START: 101<br>SCENE END: 215 |
| BOB TALKING<br>TAGGED ITEMS B,C | SCENE START: 216<br>SCENE END: 513 |
| JIM TALKING<br>TAGGED ITEM A | SCENE START: 514<br>SCENE END: 964 |
| BOB TALKING<br>TAGGED ITEMS B,C | SCENE START: 965<br>SCENE END: 1168 |
| JIM TALKING<br>TAGGED ITEM A | SCENE START: 1169<br>SCENE END: 1753 |
| BOB TALKING<br>TAGGED ITEMS B,C | SCENE START: 1754<br>SCENE END: 2144 |
| JIM TALKING<br>TAGGED ITEM A | SCENE START: 2145<br>SCENE END: 2379 |
| BOB TALKING<br>TAGGED ITEMS B,C | SCENE START: 2380<br>SCENE END: 2877 |
| CLOSING | SCENE START: 2878<br>SCENE END: 3500 |

Fig. 6
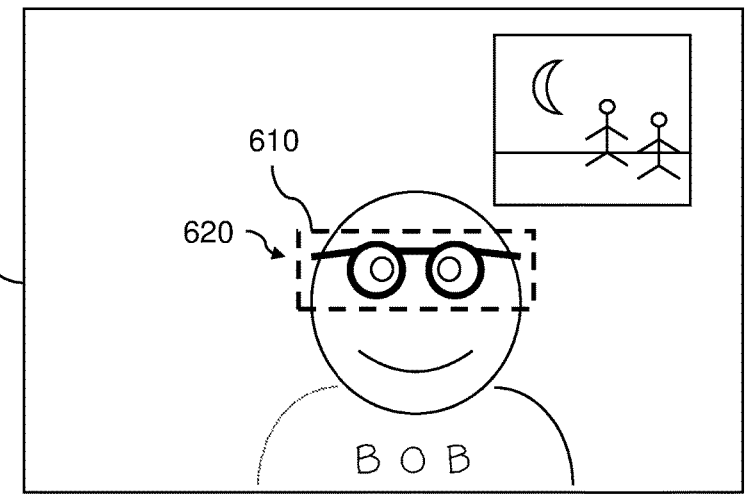
Fig. 7
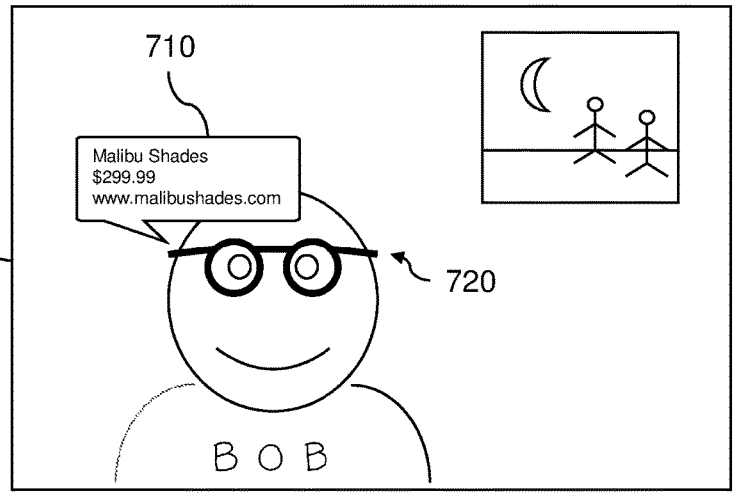
Fig. 8
| SCENE ID | SCENE START | SCENE END | PREV SCENE | NEXT SCENE |

| SCENE ID | SCENE START | SCENE END | PREV SCENE | NEXT SCENE |
|---|---|---|---|---|
| 1 | 0 | 100 | | |
| 2 | 101 | 215 | | 4 |
| 3 | 216 | 513 | | 5 |
| 4 | 514 | 964 | 2 | 6 |
| 5 | 965 | 1168 | 3 | 7 |
| 6 | 1169 | 1753 | 4 | 8 |
| 7 | 1754 | 2144 | 5 | 9 |
| 8 | 2145 | 2379 | 6 | |
| 9 | 2380 | 2877 | 7 | |
| 10 | 2878 | 3500 | | |

METHOD AND SYSTEM FOR SEEDING VIDEO PROGRAMS WITH EPISODIC INTERACTIVE ITEMS

CROSS-REFERENCE TO RELATED APPLICATION

This application claims the benefit of U.S. Provisional Application No. 62/452,336, filed Jan. 30, 2017.

BACKGROUND OF INVENTION

The present invention relates to seeding video programs with interactive items and, more particularly, seeding video programs with episodic interactive items.

Video programs, such as streaming media videos, are often seeded with interactive items containing hidden information. These interactive items may be visual representations of landmarks, such as buildings or monuments; goods, such as vehicles, appliances, furniture, clothing or jewelry; or virtually any other kind of item appearing in a video. The hidden information is generally revealed when a person clicks or taps on the items while watching the video on a computer or smart phone. Hidden information may include, for example, item descriptions, pricing information and web links.

To seed a video program with an interactive item, a developer working at a computer running a video seeding program typically tags the item at a frame of the video by drawing a boundary around it and assigning hidden information to it. The program then programmatically tracks the item across other frames of the video, building an item record that stores the on-screen location and size of the item in every frame of the video where it appears. When a person watching the video on a computer or smart phone subsequently clicks or taps on the item, the computer or smart phone confirms from the item record that the item is present at the clicked or tapped location and frame. The hidden information associated with the item is then revealed to the viewer.

Items in video programs often change visual appearance across frames. For example, as a video camera pans across a scene or a person in a scene moves, items may move, rotate, change in shape, change in size, brighten, dim or undergo other kinds of visual changes.

Moreover, some items in video programs are episodic. Episodic items disappear from the screen after a first scene and reappear in later scenes filmed at the same location as the first scene. For example, a video may be an interview conducted between two people at different locations. The video may switch back and forth between Location 1 where Person 1 asks questions and Location 2 where Person 2 answers questions. In that situation, items on screen may disappear and reappear as the video location switches back and forth between locations.

Video seeding programs often suffer tracking loss when attempting to track episodic items across a video program. Some processes stop tracking an episodic item when it disappears from screen at the boundaries of the scene where it is tagged (i.e., the start and end frame of the scene). In these environments, the developer has the burden to separately tag the item in every scene of the video where the item appears to achieve tracking of the item across the entire video. Other processes keep searching for the item after it disappears from screen and resume tracking the item when and if it reappears in another scene. In these environments, substantial computer time and resources are wasted searching for the item in frames of the video where the item does not appear.

SUMMARY OF INVENTION

The present invention provides a computer-implemented method and system for seeding video programs with episodic interactive items that substantially improve computer performance by averting tracking loss. The invention exploits the fact that episodic items in videos appear in companion scenes that are visually similar to one another. In the invention, a scene map table is constructed for a video program to be seeded with interactive items. The scene map table maintains a scene record for every scene in the video. The scene record contains boundary information for the scene and linking information to companion scenes that are visually similar. When a developer tags an episodic item in the video for interactivity, the scene record for the scene where the item is tagged is accessed in the scene map table. The boundary information from this scene record is used to track the item across the scene and the linking information from this scene record is used to access scene records for companion scenes, allowing the item to be tracked across the companion scenes. The scene map table prevents tracking loss of episodic items, relieving developers of the burden to separately tag episodic items in every scene of a video where they appear and improving computer function by eliminating the search for episodic items in frames of a video where the items do not appear. The computer time and resource savings realized by the invention increase with the number of episodic items tagged and tracked in a video program.

In one aspect of the invention, a method for seeding a video program with episodic interactive items comprises receiving a video program having a plurality of scenes by a computer system; storing the video program in a memory on the computer system; constructing a scene map table having a plurality of scene records for the plurality of scenes in the memory, each scene record containing boundary information and linking information for one of the scenes; detecting that an item is tagged at a first scene of the video program by the computer system; accessing in the scene map table a first scene record for the first scene by the computer system; tracking the item across the first scene using boundary information from the first scene record by the computer system; accessing in the scene map table a companion scene record for a companion scene to the first scene by the computer system using linking information from the first scene record; and tracking the item across the companion scene by the computer system using boundary information from the companion scene record.

In some embodiments, the constructing step comprises comparing images from consecutive frames of the video program for similarity and setting scene boundaries in the scene map table where images from consecutive frames are determined to be dissimilar.

In some embodiments, the constructing step comprises comparing images from scene end frames of the video program with images from scene start frames of the video program for similarity and linking scenes in the scene map table where an image from a scene end frame and an image from a scene start frame are determined to be similar.

In some embodiments, the first accessing step comprises determining that a frame of the video program where the item is tagged is between a scene start frame and a scene end frame of the first scene record.

In some embodiments, the first tracking step comprises tracking the item backward to a scene start frame of the first scene record.

In some embodiments, the first tracking step comprises tracking the item forward to a scene end frame of the first scene record.

In some embodiments, the second accessing step comprises accessing a previous scene identifier from the first scene record.

In some embodiments, the second accessing step comprises accessing a next scene identifier from the first scene record.

In some embodiments, the second tracking step comprises tracking the item backward to a scene start frame of the companion scene record.

In some embodiments, the second tracking step comprises tracking the item forward to a scene end frame of the companion scene record.

In some embodiments, the first and second tracking steps comprise constructing in the memory an item record for the item identifying a screen location and size of the item in every frame of the video program where the item appears.

In some embodiments, the method further comprises embedding the scene map table as metadata in the video program by the computer system.

In another aspect of the invention, a computer system comprises a network interface configured to receive a video program having a plurality of scenes; a memory coupled to the network interface configured to store the video program and a scene map table having a plurality of scene records for the plurality of scenes, wherein each scene record contains boundary information and linking information for one of the scenes; and a processor coupled to the memory configured to construct the scene map table in the memory, detect that an item is tagged at a first scene of the video program, access in the scene map table a first scene record for the first scene, track the item across the first scene using boundary information from the first scene record, access in the scene map table a companion scene record for a companion scene to the first scene using linking information from the first scene record, and track the item across the companion scene using boundary information from the companion scene record.

In yet another aspect of the invention, a computer system comprises a memory storing a scene map table containing a plurality of scene records corresponding to a respective plurality of scenes in a video program, each of the plurality of scene records including for a different scene in the video program a scene identifier, scene boundary information and scene linking information, wherein the scene boundary information includes a scene start frame identifier and a scene end frame identifier and wherein the scene linking information includes a previous scene identifier and a next scene identifier; and a processor operatively coupled to the memory configured to access the scene records to track an episodic item across a scene of the video program where an item is tagged using the scene boundary information and track the item across companion scenes of the video program using the scene linking information and the scene boundary information.

In some embodiments, the processor is configured to populate the memory with the scene records.

These and other aspects of the invention will be better understood by reference to the detailed description of a preferred embodiment taken in conjunction with the drawings briefly described below. Of course, the scope of the invention is defined by the appended claims.

BRIEF DESCRIPTION OF THE DRAWINGS

FIG. 5 shows scene catalog for a video program containing episodic items.

FIG. 6 shows tagging of an episodic item in a video program.

FIG. 7 shows hidden information revealed from a tagged episodic item.

FIG. 8 shows a format for a scene record in a scene map table.

FIG. 11 shows a populated scene map table.

DETAILED DESCRIPTION OF A PREFERRED EMBODIMENT

Figure 1:
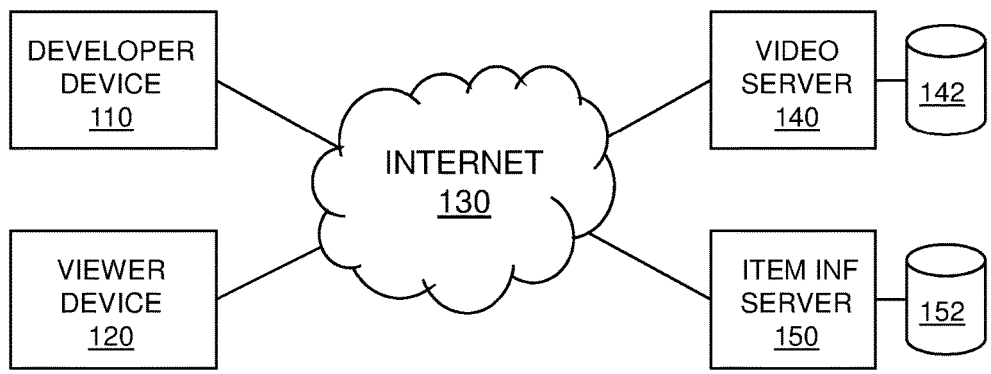
FIG. 1 shows a computer system.

FIG. 1 shows a computer system 100. System 100 includes a developer device 110, such as a desktop computer, notebook computer or tablet computer, and a viewer device 120, such as a desktop computer, notebook computer, tablet computer or smart phone. Devices 110, 120 are communicatively coupled with a video server 140 and an item information server 150 over the Internet 130. Video server 140 manages a video database 142 containing video programs, such as streaming media video files (e.g., YouTube videos, Vimeo videos, etc.) Item information server 150 manages an item information database 152 containing profiles, such as eXtensible Markup Language (XML) files, for interactive items within videos. Generally speaking, items in a video are rendered interactive by tagging the items with hidden information and programmatically tracking the items on developer device 110 using a video seeding program. Profiles containing information about these interactive items, such as item screen locations and sizes at different frames of the video and hidden information to be revealed when the item is selected by a viewer of the video, are stored in item information database 152. The video is then streamed from video server 140 to viewer device 120 and item information server 150 reveals hidden information linked to interactive objects in the video when the items are selected on viewer device 120, such as by a mouse click or finger tap. These operations may be facilitated using one or more of the following technologies: browser-based HTML5, JavaScript with the <video/> and <canvas/> elements and/or Adobe Flash Video Player. While one instance of each computing device is shown in system 100 for simplicity, a computer system operative in accordance with the invention may include plural developer devices, viewer devices, video servers, item information servers, video databases and/or item information databases.

Figure 2:
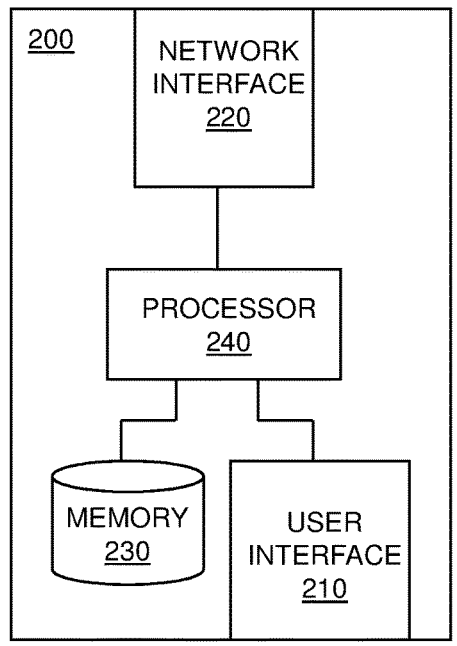
FIG. 2 shows a computing device.

FIG. 2 shows a computing device 200 that is representative of developer device 110 and viewer device 120. Computing device 200 has a user interface 210, a network interface 220 and a memory 230, all in communication with a processor 240. User interface 210 includes one or more input mechanisms, such as a keyboard, computer mouse, microphone and/or touch screen, for receiving inputs from a user (e.g., developer or viewer). User interface 210 also has one or more output mechanisms, such as a video display and/or a loudspeaker, for transmitting outputs to a user. Network interface 220 is a communication interface, such as a wired or wireless LAN interface, for communicating with remote computing devices over the Internet 130 and with any local computing devices. Memory 230 is a storage element that includes random access memory (RAM) and read-only memory (ROM). Memory 230 has software programs installed thereon with instructions that are executable by processor 240 to perform operations described herein. In embodiments of the invention, processor 240 also includes custom circuitry for performing operations described herein. Memory 230 also has data tables constructed thereon that facilitate operations described herein.

On developer device 110, the software programs include a video seeding program and the data tables include a scene map table. In embodiments of the invention, developer device 110 is a CUDA-enabled graphics processing unit (GPU).

On viewer device 120, the software programs include a web browser, such as Microsoft Internet Explorer, Apple Safari, Mozilla Firefox, Google Chrome or Opera.

Seeding of a video program with an interactive item proceeds as follows: Developer device 110 downloads via network interface 220 a video program to be seeded. Downloading may be initiated by inputs received on user interface 210 from a human developer into a video seeding program running on developer device 110. The downloaded video program may be, for example, a movie, television show, virtual fashion show, virtual tour of a city or home, business or museum, instructional video or infomercial. The video program may be downloaded from video database 142 under the control of video server 140 or from another source. Once downloaded, the video program is loaded into the video seeding program running on developer device 110.

Next, the developer, via inputs on user interface 210, advances the video program to a frame where an item appears that the developer wishes to make interactive. The item may be any separately identifiable object that appears in any frame of the video, such as a fixture (e.g., bathtub, sink), furniture (e.g., bed, clock), furnishing (e.g., bed sheets, pillow), appliance (e.g., refrigerator, coffee maker, microwave), vehicle (e.g., car, motorcycle, bicycle), wearable item (e.g., shirt, shoe, necklace, watch, glasses), decorative item (e.g., plant, sculpture) or leisure item (e.g., game, toy).

Next, the developer, via inputs on user interface 210, draws a boundary around the item. For example, the developer may use a computer mouse or finger taps and swipes on developer device 110 to create a rectangle or other bounding geometric shape and resize the shape as needed to outline the item.

Next, the developer, via inputs on user interface 210, assigns hidden information to the item. The hidden information may be, by way of example, an item name, item description, pricing information, phone number, web link, email address, physical address, map, image, audio clip or video clip. This hidden information is not initially perceptible when a viewer later watches the video program but may be accessed by the viewer through on screen interaction with the item (e.g., mouse click or screen tap on the item) while watching the video.

At this point, developer device 110, either programmatically or in response to user input, instructs item information server 150 to create and save a profile for the item in item information database 152. The item profile may be an XML file or other database entry. The item profile includes a frame identifier of the frame where the item was outlined, a screen location of the item in that frame, a size of the item in that frame and the hidden information. By way of example, the frame time (e.g., 0.00 seconds for the start frame of the video program), the positional (e.g., x, y) coordinates relative to the frame of the top left corner of the item and the item width and height in the frame may be generated and saved along with the hidden information in the item profile.

Next, an image of the item is constructed from the outlined item. The item image may be a .PNG image, for example. The item image may be built without user intervention or in response to user input on developer device 110.

Next, a color histogram of the item is constructed using the item image. The color histogram allows the item to be programmatically tracked across other frames of the video program. Developer device 110, without user intervention or in response to user input, interfaces with item information server 150 to update the item profile in item information database 152 to include the color histogram of the item. Alternatively, the color histogram may be saved locally in memory 230 on developer device 110.

Next, the item is programmatically tracked across other frames of the video program where the item appears. A new frame in the video program is selected. Developer device 110 retrieves the color histogram for the item from item information database 152 or from memory 230 on developer device 110. Developer device 110 then searches the current frame image for the item image using the color histogram. The search may be conducted using the Camshift algorithm, by way of example. When the item image is located, developer device 110 records the frame identifier, screen location and size of the item in the current frame. Developer device 110 then instructs item information server 150 to append the item profile for the item in item information database 152 with the newly recorded information. The tracking process is repeated for other frames of the video program.

A viewer who plays a video program having interactive items created through the tagging and tracking process described above then accesses the hidden information assigned to these items through interaction with the items while watching the video. Hidden information retrieval is achieved through browser-based interaction involving a viewer watching the video program on viewer device 120 and video server 140, under processor control.

First, the viewer accesses a website that provides videos programs having interactive objects. Website access is achieved through browser-based interaction of viewer device 120 with video server 140, which hosts the website and manages video database 142 containing videos, such as YouTube or Vimeo streaming media video files.

Next, the viewer selects from the website a video program to be viewed. The selection is made through browser-based interaction of viewer device 120 with video server 140 and a connection, which may be a streaming connection, is configured between viewer device 120 and video server 140.

Next, screen location information and hidden information for interactive items in the selected video program is retrieved. In some embodiments, video server 140 queries item information server 150, causing item information server 150 to download item profiles for interactive items in the selected video to viewer device 120. In other embodiments, viewer device 120 queries item information server 150, causing item information server 150 to download item profiles for interactive items in the selected video to viewer device 120.

Next, the viewer commences the video stream through browser-based interaction of viewer device 120 with video server 140. For example, the viewer may mouse-click or screen-tap a play button of a video player displayed in a web browser of viewer device 120 that has a streaming connection with video server 140.

Once the video stream has commenced, viewer device 120 begins to monitor for a mouse click or screen tap event on a frame of the video program being streamed. Monitoring for a mouse click or screen tap event persists if the video is rewound, fast forwarded or paused.

When a mouse click or screen tap event is detected, viewer device 120 generates screen location information for the event. By way of example, the frame time and the (x,y) screen coordinates of the event may be generated.

Next, viewer device 120 searches for interactive items in the video program being streamed that match the event screen location information. More particularly, viewer device 120 compares the event screen location information with the screen locations of interactive items in the video as recorded in the item profiles. A matching item is found if the event screen location information is within the screen location boundaries of an interactive item. Naturally, if the frame contains different items whose boundaries overlap, the search may reveal multiple matching items.

If at least one matching item is found, viewer device 120 determines whether all of the matching items have already been clicked or tapped during this video streaming instance. If so, the present click or tap event is deemed redundant and viewer device 120 starts to monitor for the next click or tap event. However, if not all of the matching items have already been clicked or tapped during this video streaming instance, viewer device 120 provides access to hidden information for matching items that have not previously been clicked or tapped.

Viewer device 120 may provide access to hidden information for matching items in various ways. One way to provide access to hidden information is by immediately pausing the video and displaying the hidden information over the paused video. However, a viewer may prefer to continue viewing the video uninterrupted and to review the hidden information at his or her convenience. Thus, another way to provide access to hidden information is to build and display a user interface element (e.g., button, link, or other control) that links to the hidden information and can be activated by the viewer at his or her convenience. Still another way to provide access to hidden information is to display it immediately after the video ends.

In addition to providing access to hidden information for matching items, viewer device 120 reports matching items to item information server 150, which updates a click count for matching items. The click count provides a metric that can be readily used by companies whose products are the subject of interactive items.

An important feature of the present invention resides in substantially improving computer performance when tracking episodic items across a video program. Episodic items disappear from screen at the end of a first scene of a video and reappear in one or more companion scenes that are visually similar to the first scene. The invention averts tracking loss experienced by conventional video seeding techniques when tracking episodic items by constructing and consulting a scene map table that allows episodic items to be seamlessly and efficiently tracked across the scene in which it is tagged and companion scenes. The scene map table is constructed in RAM within memory 230 on developer device 110 and stored in ROM within memory 230, video database 142 or item information database 152 for subsequent use.

Figure 3:
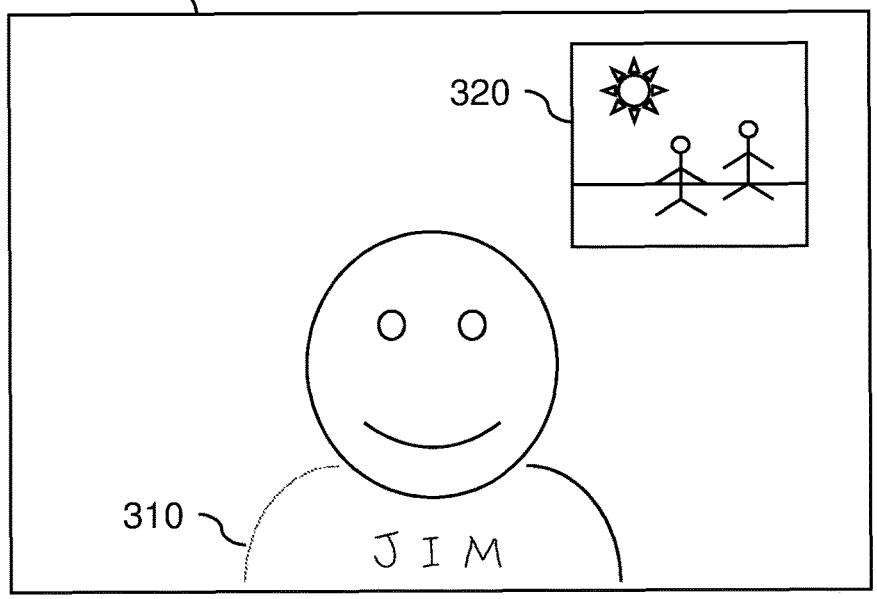
FIG. 3 shows a first scene of a video program containing episodic items.
Figure 4:
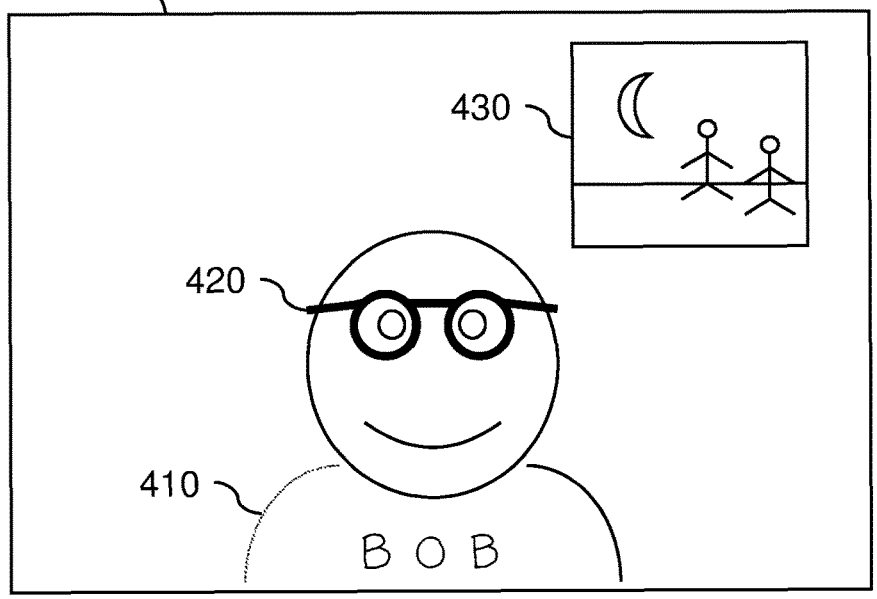
FIG. 4 shows a second scene of a video program containing episodic items.

Consider a video interview of actor Bob 410 conducted by newsman Jim 310 as illustrated in FIGS. 3-5. After an introduction scene, Jim 310 appears on camera in a first scene 300. In the background is a painting 320 that is tagged with hidden information. After Jim 310 asks Bob 410 a question, the camera cuts to a second scene 400 showing Bob 410. Bob is wearing designer glasses 420 that are tagged with hidden information, and in the background is a different painting 430 that is tagged with hidden information. During the interview, the camera cuts back and forth between Jim 310 and Bob 410 as shown in a scene catalog 500, with tagged items 320, 420, 430 disappearing and reappearing from view as the scene changes. Notably, however, painting 320 appears only in scenes where Jim is on screen (frames 101-215, frames 514-964, frames 1169-1753 and frames 2145-2379); whereas designer sunglasses 420 and painting 430 appear in only in scenes where Bob is on screen (frames 216-513, frames 965-1168, frames 1754-2144 and frames 2380-2877). The invention leverages the fact that these episodic items recur in visually similar companion scenes to promote tracking efficiency. Referring to FIGS. 6 and 7, once a developer applies a tag 610 with hidden information to Bob's designer sunglasses 620 at frame 600 of the video, the scene map table is consulted to allow sunglasses 620, without further user intervention, to be seamlessly and efficiently tracked across the scene in which it is tagged and companion scenes. This tracking, in turn, allows a viewer of the video to reveal hidden information 720 associated with sunglasses 720 by clicking or tapping on sunglasses 720 at frame 700 of the video.

FIG. 8 shows a format for a scene record 800 in the scene map table. Scene record 800 includes a scene identifier field (SCENE ID) followed by two scene boundary information fields 810, scene start frame field (SCENE START) and scene end frame field (SCENE END). Scene boundary information fields 810 are followed by two scene linking information fields 820, previous companion scene field (PREV SCENE) and next companion scene field (NEXT SCENE).

Figure 9:
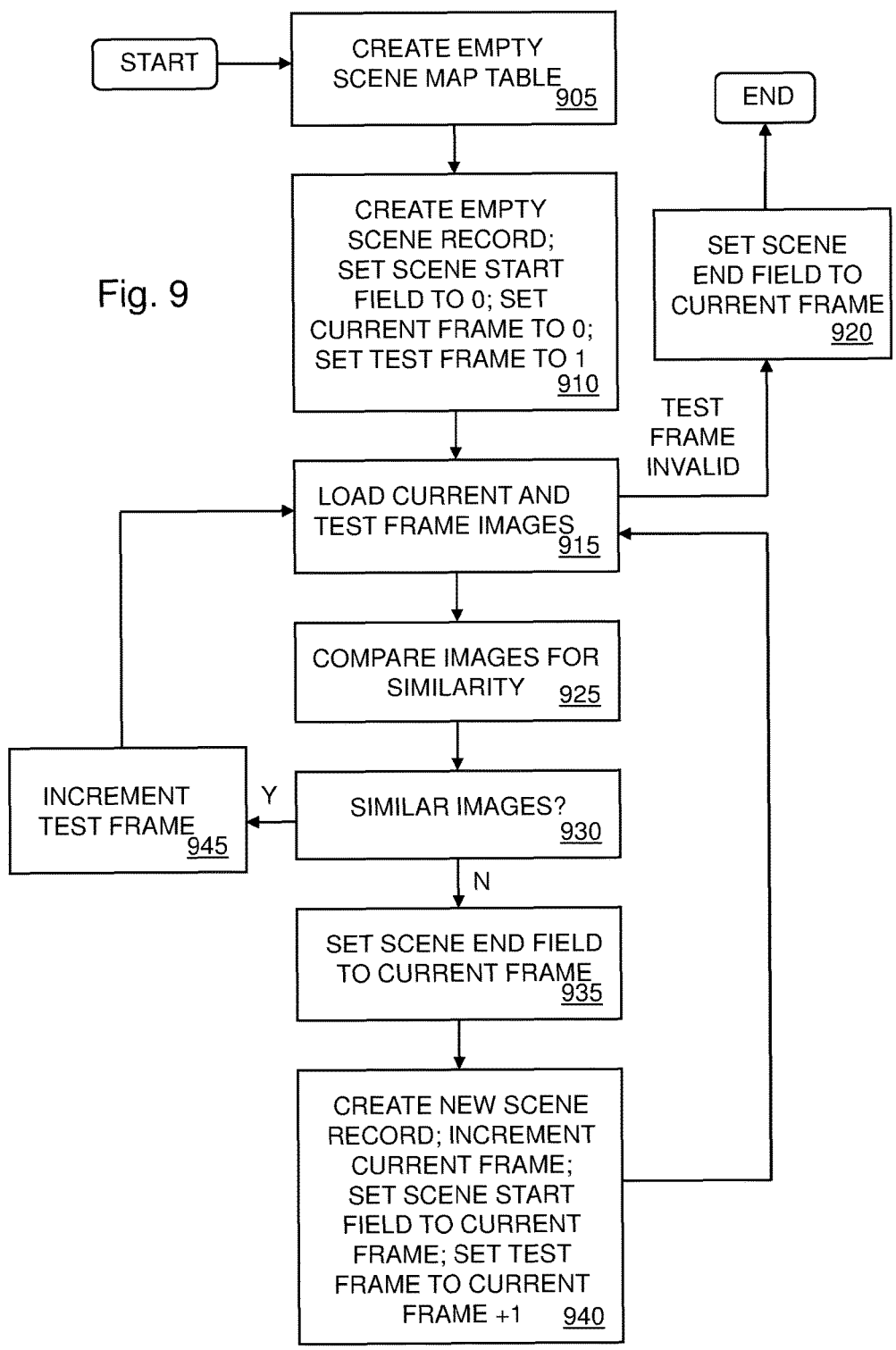
FIG. 9 shows a method for populating a scene map table with scene boundary information.

FIG. 9 shows a method for populating the scene map table with scene boundary information. In embodiments of the invention, this method is performed under the control of processor 240 on developer device 110 executing program instructions after loading a video program on developer device 110 and before tracking items in the video. In other embodiments of the invention, this method is performed by video server 140 prior to downloading the video program to developer device 110.

It bears noting that a video program consists of a number of frames, each having a different image. For example, if a video is recorded at 25 frames per second, every second of the video consists of 25 frames each having a different image. Frames are often identified by the fractional second of a video at which they appear (e.g., 3.24 seconds). However, for simplicity, frames are identified herein as a sequence of integers, starting with frame zero, based on their order of appearance in the video (i.e., 0, 1, 2, 3, 4, etc.).

At the outset of FIG. 9, an empty scene map table is created (905). An empty scene record is then created for the first scene (e.g., scene 1). The scene identifier is set and the start field in the scene record is set to zero. The current frame number is also initialized to zero and a test frame number is initialized to one (905).

Next, images from the current frame (i.e., frame 0) and test frame (i.e., frame 1) are loaded for comparative analysis (910). If the test frame is invalid (e.g., the frame does not exist), the scene end field in the scene record is set to the current frame number (920) and the process is terminated. Otherwise, the current frame image and the test frame image are compared for similarity (925). If the images are similar, the current frame and test frame are part of the same scene. On the other hand, if the images are dissimilar, the current frame and the test frame are part of different scenes and the scene map table is updated to reflect the scene boundary.

In embodiments of the invention, image similarity is determined using the Structural Similarity index method (SSIM). SSIM compares local patterns of pixel intensities, normalized for luminance and contrast, in the two images being compared. Based on this comparison, SSIM outputs a decimal value between −1 and 1, with a value of 1 indicating that the two images are identical and a value of −1 indicating that the two images are completely different. In embodiments of the invention, the SSIM output value is compared against a similarity threshold of 0.75. If the SSIM output value is above the similarity threshold, the current and test images are deemed similar (i.e., part of the same scene). On the other hand, if SSIM output value is below the similarity threshold, the current and test images are deemed dissimilar (i.e., part of different scenes). In other embodiments of the invention, image similarity is determined by calculating and comparing RBG (Red-Green-Blue) or HSV (Hue-Saturation-Value) histograms for the current and test images to determine whether the colors are significantly different, indicating a scene change.

The process then follows a conditional branch depending on whether the current frame image and the next frame image are found to be similar (930). If the images are similar, the test frame number is incremented (945) and the flow returns to Step 915. If the images are dissimilar, the scene end field in the scene record is set to the current frame number (935). A new empty scene record is created for the next scene (e.g., scene 2). The scene identifier is set and the scene start field is set to the test frame number. The current frame number is incremented and the test frame number is set to the current frame number plus one (940). The flow then returns to Step 915.

Upon completion of process of FIG. 9, the scene map table is populated with a complete scene record sequence for the video program, including scene boundary information for every scene in the form of scene start frame identifiers and scene end frame identifiers. Next, the scene map table is appended with linking information that links together companion scenes that are visually similar.

Figure 10:
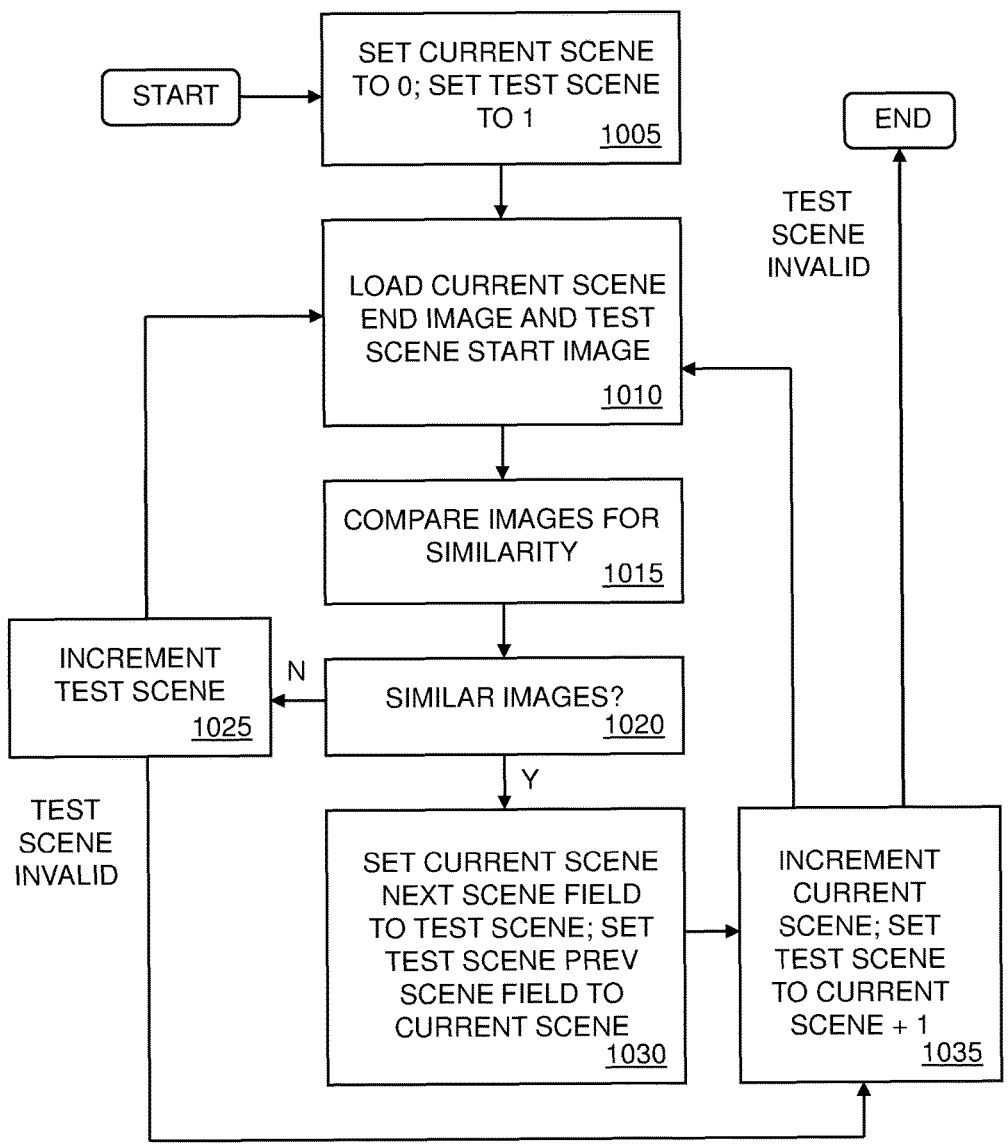
FIG. 10 shows a method for populating a scene map table with scene linking information.

FIG. 10 shows a method for populating the scene map table with scene linking information for companion scenes. In embodiments of the invention, this method is performed under the control of processor 240 on developer device 110 executing program instructions after loading a video program on developer device 110 and before tracking items in the video. In other embodiments of the invention, this method is performed by video server 140 prior to downloading the video program to developer device 110.

At the outset of FIG. 10, the current scene is set to zero and the test scene is set to one (1005). Next, the image from the end frame of the current scene and the image from the start frame of the test frame are loaded for comparative analysis (1010). Next, the current scene end frame image and the test scene start frame image are compared for similarity (1015). In embodiments of the invention, image similarity is determined using the SSIM method. In other embodiments of the invention, image similarity is determined by RBG or HSV histogram comparisons. If the images are similar, the current scene and the test scene are companion scenes and linking information is added to the scene map table to link the two scenes. On the other hand, if the images are dissimilar, the current scene and the test scene are not companion scenes.

The process then follows a conditional branch depending on whether the current scene end frame image and the test scene start frame image are found to be similar (1020). If the images are dissimilar, the test scene number is incremented (1025) and the flow returns to Step 1010, provided the new test scene is valid. If the new test scene is invalid (e.g., the scene does not exist), the current scene number is incremented, the test scene number is set to the current scene number plus one and the flow returns to Step 1010, unless the new test scene is invalid in which case the process is terminated (1035). On the other hand, if the images are found to be similar at Step 1020, the next scene field in the current scene is set to the test scene number, the previous scene field in the test scene is set to the current scene number, and the flow proceeds to Step 1035 (1030).

Upon completion of process of FIG. 10, the scene map table is fully populated with a complete scene record sequence for the video program, including scene boundary information for every scene in the form of scene start frame identifiers and scene end frame identifiers, and complete linking information that links together companion scenes that are visually similar.

FIG. 11 shows a scene map table 1100 constructed using the methods of FIGS. 9 and 10 for the video program containing episodic items cataloged in FIG. 5. Scene map table 1100 contains ten scene records corresponding to the ten scenes of the video shown in FIG. 5. Each scene record includes scene boundary information in the form of a scene start frame number and a scene end frame number for a particular scene, populated using the technique of FIG. 9. Where applicable, each scene record further includes linking information in the form of a previous scene number and a next scene number of companion scenes, populated using the technique of FIG. 10.

Once constructed, the scene map table is saved in ROM within memory 230, in video database 142, or in item information database 152. Once saved to permanent storage, the scene map table can be consulted, without the need to reconstruct the table using the methods of FIGS. 9 and 10, to expedite multiple instances of tracking tagged objects across the video program. In embodiments of the invention, the scene map table is saved as a Javascript Object Notation (JSON) or XML file. In embodiments of the invention, the scene map table is embedded as metadata in the video program and the video program containing the metadata is saved.

Figure 12:
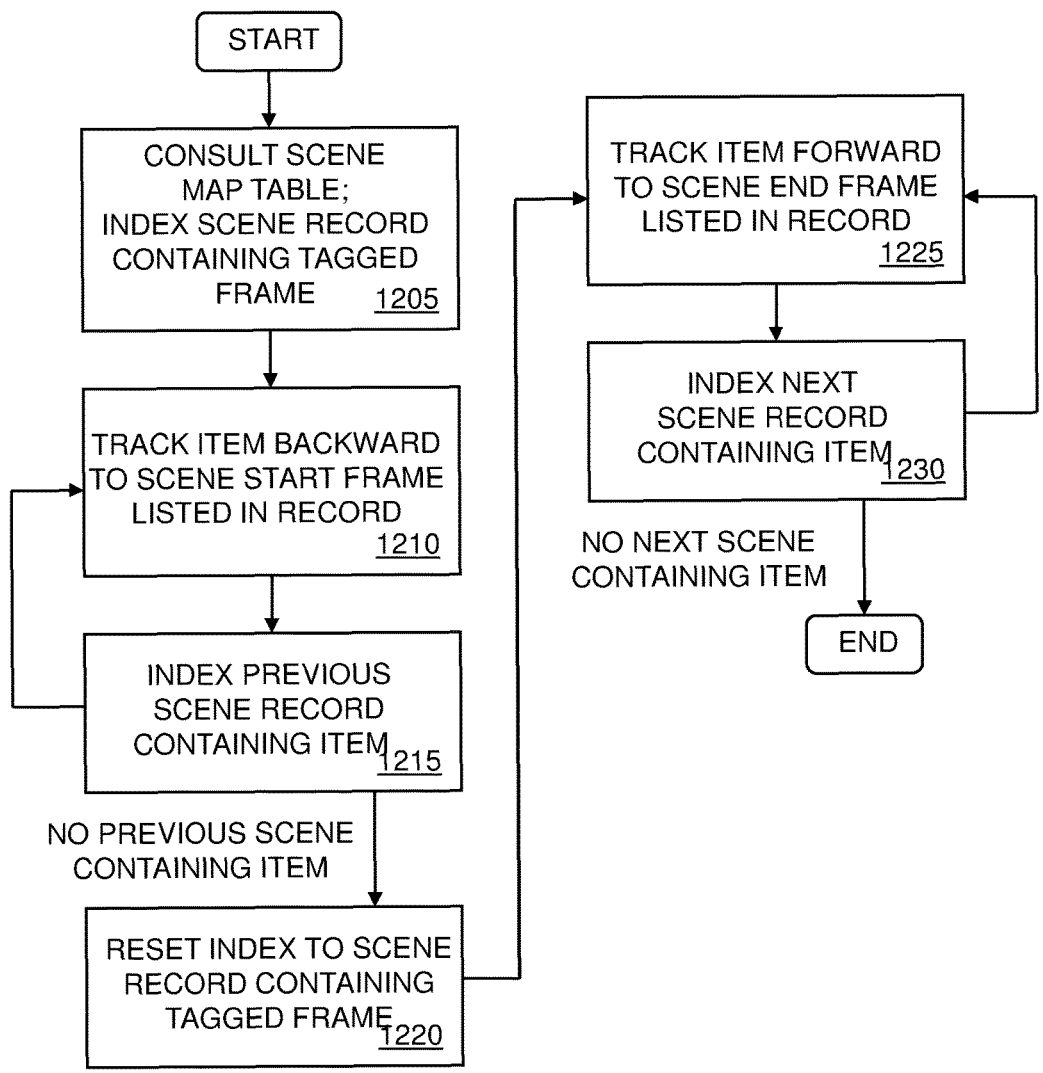
FIG. 12 shows a method for programmatically tracking a tagged episodic item across a video program using a scene map table.

Turning finally to FIG. 12, a method for programmatically tracking a tagged episodic item across a video program using the scene map table is illustrated. In embodiments of the invention, this method is performed under the control of processor 240 on developer device 110 executing program instructions.

The tracking method of FIG. 12 starts after developer device 110, prompted by a human developer using a video seeding program, downloads a video program and tags an episodic item at any frame of the video where the item appears. In embodiments where the scene map table is not stored locally in memory 230 or embedded in the downloaded video, the scene map table is also downloaded to developer device 110. Once the tag is applied, the scene map table is consulted and the scene record of the scene where the item is tagged is indexed (1205). More particularly, the scene record is indexed which has a scene start frame number less than or equal to the frame number of the frame where the item is tagged and a scene end frame number greater than or equal to the frame number of the frame where the item is tagged.

Next, the item is tracked backward frame-by-frame from the tagged frame to the scene start frame stored in the indexed scene record (1210). The previous scene field in the scene record is then checked for an identifier of a previous companion scene. If a previous companion scene identifier is found, the scene record of the previous companion scene is indexed using the identifier (1215) and the flow returns to Step 1210, whereupon the item is tracked backward frame-by-frame from the scene end frame to the scene start frame of the previous companion scene. If no previous companion scene identifier is found at Step 1215, the index is reset to the scene record of the scene where the item is tagged (1220).

The item is then tracked forward frame-by-frame from the tagged frame to the scene end frame stored in the indexed scene record (1225). The next scene field in the scene record is then checked for an identifier of a next companion scene. If a next companion scene identifier is found, the scene record of the next companion scene is indexed using the identifier (1230) and the flow returns to Step 1230 where the item is tracked forward frame-by-frame from the scene start frame to the scene end frame of the next companion scene. If there is no next companion scene at Step 1235, the process terminates.

Upon completion of tracking process of FIG. 12, item information database 152 has stored thereon an item profile for the episodic item for all frames of the video where the item appears. Advantageously, through the expedient of the scene map table, this profile is created without tracking loss, relieving the developer of the burden to separately tag the item in every scene of the video where it appears and improving computer performance by eliminating programmatic searching for the item in every frame of the video. The tracking process of FIG. 12 may be repeated for any number of episodic items appearing in the video, multiplying the savings in computing time and resources realized through application of the scene map table.

It will be appreciated by those of ordinary skill in the art that the invention can be embodied in other specific forms without departing from the spirit or essential character hereof. For example, processor 240 may include custom circuitry which performs or facilitates one or more steps of FIG. 9, 10 or 12. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A method for seeding a video program with episodic interactive items, comprising:
   receiving a video program having a plurality of scenes by a computer system;
   storing the video program in a memory on the computer system;
   constructing in the memory a scene map table having a plurality of scene records for the plurality of scenes by the computer system, the scene records containing boundary information and linking information for the scenes, the linking information linking companion scenes in the video program where an episodic item appears while bypassing intervening scenes in the video program where the episodic item does not appear;
   detecting that an item is tagged at a first scene of the video program by the computer system;
   accessing in the scene map table a first scene record for the first scene by the computer system;
   tracking the tagged item across the first scene using boundary information from the first scene record by the computer system;
   accessing in the scene map table a companion scene record for a companion scene to the first scene by the computer system using linking information from the first scene record; and
   tracking the tagged item across the companion scene by the computer system using boundary information from the companion scene record.

2. The method of claim 1, wherein the constructing step comprises:
   comparing images from consecutive frames of the video program for similarity; and
   setting scene boundaries in the scene map table where images from consecutive frames are determined to be dissimilar.

3. The method of claim 1, wherein the constructing step comprises:
   comparing images from scene end frames of the video program with images from scene start frames of the video program for similarity; and
   linking scenes in the scene map table where an image from a scene end frame and an image from a scene start frame are determined to be similar.

4. The method of claim 1, wherein the first accessing step comprises determining that a frame of the video program where the item is tagged is between a scene start frame and a scene end frame of the first scene record.

5. The method of claim 1, wherein the first tracking step comprises tracking the tagged item backward to a scene start frame of the first scene record.

6. The method of claim 1, wherein the first tracking step comprises tracking the tagged item forward to a scene end frame of the first scene record.

7. The method of claim 1, wherein the second accessing step comprises accessing a previous scene identifier from the first scene record.

8. The method of claim 1, wherein the second accessing step comprises accessing a next scene identifier from the first scene record.

9. The method of claim 1, wherein the second tracking step comprises tracking the tagged item backward to a scene start frame of the companion scene record.

10. The method of claim 1, wherein the second tracking step comprises tracking the tagged item forward to a scene end frame of the companion scene record.

11. The method of claim 1, wherein the first and second tracking steps comprise constructing in the memory an item record for the tagged item identifying a screen location and size of the tamed item in every frame of the video program where the tagged item appears.

12. The method of claim 1, further comprising embedding the scene map table as metadata in the video program by the computer system.

13. A computer system, comprising:
    a network interface configured to receive a video program having a plurality of scenes;
    a memory coupled to the network interface configured to store the video program and a scene map table having a plurality of scene records for the plurality of scenes, wherein the scene records contain boundary information and linking information for the scenes, the linking information linking companion scenes in the video program where an episodic item appears while bypassing intervening scenes in the video program where the episodic item does not appear; and
    a processor coupled to the memory configured to construct the scene map table in the memory, detect that an item is tagged at a first scene of the video program, access in the scene map table a first scene record for the first scene, track the tamed item across the first scene using boundary information from the first scene record, access in the scene map table a companion scene record for a companion scene to the first scene using linking information from the first scene record, and track the tagged item across the companion scene using boundary information from the companion scene record.

14. The system of claim 13, wherein the processor is configured to compare images from consecutive frames of the video program for similarity and set scene boundaries in the scene map table where images from consecutive frames are determined to be dissimilar.

15. The system of claim 13, wherein the processor is configured to compare images from scene end frames of the video program with images from scene start frames of the video program for similarity and link scenes in the scene map table where an image from a scene end frame and an image from a scene start frame are determined to be similar.

16. The system of claim 13, wherein the processor is configured to determine that a frame of the video program where the item is tagged is between a scene start frame and a scene end frame of the first scene record.

17. The system of claim 13, wherein the processor is configured to track the tagged item backward to a scene start frame of the first scene record.

18. The system of claim 13, wherein the processor is configured to track the tagged item forward to a scene end frame of the first scene record.

19. The system of claim 13, wherein the processor is configured to access a previous scene identifier from the first scene record.

20. The system of claim 13, wherein the processor is configured to access a next scene identifier from the first scene record.

21. The system of claim 13, wherein the processor is configured to track the tagged item backward to a scene start frame of the companion scene record.

22. The system of claim 13, wherein the processor is configured to track the tagged item forward to a scene end frame of the companion scene record.

23. The system of claim 13, wherein the processor is configured to construct in the memory an item record for the tagged item identifying a screen location and size of the tagged item in every frame of the video program where the tagged item appears.

24. The system of claim 13, wherein the processor is further configured to embed the scene map table as metadata in the video program.

25. A method for seeding a video program with episodic interactive items, comprising:
    receiving a video program having a plurality of scenes by a computer system;
    storing the video program in a memory on the computer system;
    constructing in the memory a scene map table having a plurality of scene records for the plurality of scenes by the computer system, the scene records containing boundary information and linking information for the scenes, the linking information linking companion scenes in the video program which are overlapping;
    detecting that an item is tagged at a first scene of the video program by the computer system;
    accessing in the scene map table a first scene record for the first scene by the computer system;
    tracking the tagged item across the first scene using boundary information from the first scene record by the computer system;
    accessing in the scene map table a companion scene record for a companion scene to the first scene by the computer system using linking information from the first scene record; and
    tracking the tagged item across the companion scene by the computer system using boundary information from the companion scene record.

* * * * *